(12) United States Patent
O'Connell

(10) Patent No.: US 11,850,667 B2
(45) Date of Patent: Dec. 26, 2023

(54) CHUCK JAW STOPPING MECHANISM

(71) Applicant: Bradley D. O'Connell, Noti, OR (US)

(72) Inventor: Bradley D. O'Connell, Noti, OR (US)

( * ) Notice: Subject to any disclaimer, the term of this patent is extended or adjusted under 35 U.S.C. 154(b) by 137 days.

(21) Appl. No.: 17/452,290

(22) Filed: Oct. 26, 2021

(65) Prior Publication Data

US 2022/0126377 A1 Apr. 28, 2022

Related U.S. Application Data

(60) Provisional application No. 63/198,565, filed on Oct. 28, 2020.

(51) Int. Cl.
*B23B 31/10* (2006.01)
*B23B 31/16* (2006.01)

(52) U.S. Cl.
CPC ........ *B23B 31/102* (2013.01); *B23B 31/1627* (2013.01); *B23B 2260/12* (2013.01)

(58) Field of Classification Search
CPC .............. B23B 31/102; B23B 31/1627; B23B 2260/12
See application file for complete search history.

(56) References Cited

U.S. PATENT DOCUMENTS

| | | |
|---|---|---|
| 3,104,474 A | 9/1963 | Rehart |
| 3,160,042 A | 12/1964 | Grand |
| 3,594,960 A * | 7/1971 | Fourquier ............. B23B 31/102 |
| | | 279/154 |
| 3,945,654 A | 3/1976 | McMullen |
| 4,041,612 A | 8/1977 | Skubic |
| 4,223,898 A | 9/1980 | Rihi |
| 4,530,508 A | 7/1985 | Ferraro |
| 4,556,228 A | 12/1985 | Ferraro |
| 4,561,663 A | 12/1985 | Ferraro |
| 4,640,518 A | 2/1987 | Ferraro |
| 4,696,482 A | 9/1987 | Brown |
| 4,746,131 A | 5/1988 | Mathes |
| 4,772,034 A | 9/1988 | Brown |
| 4,928,981 A * | 5/1990 | Brown .................. B23B 31/102 |
| | | 279/154 |
| 5,141,239 A * | 8/1992 | Clay ................. B23B 31/16012 |
| | | 279/123 |
| 5,155,898 A | 10/1992 | Gutierrez |

(Continued)

FOREIGN PATENT DOCUMENTS

| | | |
|---|---|---|
| EP | 0308556 | 9/1987 |
| WO | WO 98/17429 | 4/1998 |

*Primary Examiner* — Eric A. Gates
(74) *Attorney, Agent, or Firm* — Trenner Law Firm, LLC; Mark Trenner

(57) ABSTRACT

A chuck jaw stopping mechanism is disclosed for forming a soft jaw for a lathe. An example of the chuck jaw stopping mechanism includes a stopping device. The example chuck jaw stopping mechanism also includes a securement device configured to connect the stopping device on a master jaw of a chuck of the lathe. The example chuck jaw stopping mechanism also includes a lower surface of the stopping device that moves against a portion of an outer circumference of the chuck in a closed position. The lower surface also moves away from the portion of the outer circumference of the chuck in an open position to form a gap between the lower surface of the stopping device and the portion of the outside circumference of the chuck.

18 Claims, 11 Drawing Sheets

(56) References Cited

U.S. PATENT DOCUMENTS

| | | |
|---|---|---|
| 5,163,693 A | 11/1992 | Jaggers |
| 5,791,661 A | 8/1998 | Reyes |
| 5,944,331 A | 8/1999 | Kim |
| D590,229 S | 4/2009 | Reece, Jr. |
| 8,578,588 B2 | 11/2013 | Karlein |
| 2011/0115172 A1 | 5/2011 | Ogawa et al. |

* cited by examiner

CHUCK JAW STOPPING MECHANISM

PRIORITY CLAIM

This application claims the priority filing benefit of U.S. Provisional Patent Application No. 63/198,565 filed Oct. 28, 2020 for "Chuck Jaw Stopping Mechanism" of Bradley D. O'Connell, hereby incorporated by reference in its entirety as though fully set forth herein.

BACKGROUND

A lathe is a machine used in manufacturing to make parts out of an unfinished workpiece often referred to as a slug or bar or casting. The unfinished workpiece may be any material that is machinable by the lathe. During the machining operation, the unfinished workpiece is clamped or otherwise held on the lathe. The lathe spins or rotates the unfinished workpiece. A cutting tool removes material from the unfinished workpiece to create a finished workpiece (e.g., the part being made or manufactured).

The lathe includes a chuck to clamp the workpiece. The chuck is configured to rotate about a centerline or axis of rotation of the workpiece. The chuck typically has multiple jaws that move in an inward direction to a closed position for clamping, and an outward direction to an open position for unclamping.

Some chucks may have "hard jaws" that clamp the workpiece in place. Other chucks may have "soft jaws" or "machinable jaws." For a soft or machinable jaw, a soft machinable material is bolted to the master jaw (e.g., using a T-nut to hold it securely in place). A chuck with a soft jaw may be used when more precision is required to hold the centerline of the workpiece closer to the axis of rotation. A chuck with a soft jaw may also be used when the jaw is machined to a specific diameter to match the workpiece that it is gripping. This can help in many ways. For example, no clamping marks are left on the finished workpiece. In addition, the soft jaw provides more surface area of contact, thereby substantially increasing concentricity of the workpiece.

Example use of a soft jaw involves clamping a piece of material (clamping plug) in the soft jaws behind where these will be turned. But there are two problems with this. One problem is this technique does not work where the soft jaw cannot be bored all the way through. Another problem is it can be difficult to mount the workpiece straight or parallel when clamping a short or thin workpiece. If the clamping plug does not run parallel, it puts uneven pressure on the jaws and causes the finished part to not be parallel.

Another device is a clamping ring that locates in counterbored holes in the face of the soft jaws. This allows the jaws to be bored through. But the boring tool has to be extended out to allow for clearance, which causes other problems. For example, when a boring tool is extended, the tool tends to vibrate (known in the industry as "chatter"). This vibration or chatter results in poor finishes and less accuracy in the finished workpiece. In addition, the clamping ring can be in the way (e.g., out in front) of the working area, and thus does not allow for boring out larger diameters in the workpiece.

DETAILED DESCRIPTION

A chuck jaw stopping mechanism is disclosed for forming a soft jaw for a lathe. An example of the chuck jaw stopping mechanism includes a stopping device. The example chuck jaw stopping mechanism also includes a securement device configured to connect the stopping device on a master jaw of a chuck of the lathe. The example chuck jaw stopping mechanism also includes a lower surface of the stopping device that moves against a portion of an outer circumference of the chuck in a closed position. The lower surface also moves away from the portion of the outer circumference of the chuck in an open position to form a gap between the lower surface of the stopping device and the portion of the outside circumference of the chuck.

Once installed on the lathe, the chuck jaw stopping mechanism stops all of the master jaws uniformly at a predetermined position for the jaw forming operation. This helps maintain a uniform pressure on the soft jaws during the jaw forming operation, and holds the soft jaws concentric in the axis of rotation so that the operator can properly machine or form the soft jaws to the specific shape that is needed to hold a workpiece during later machining operations.

In an example, the chuck jaw stopping mechanism may be implemented to form soft jaws to a precise specification without needing a separate tool to hold the soft jaws in place that would otherwise get in the way of the working area. The chuck jaw stopping mechanism also eliminates the need for multiple (e.g., hundreds) of different size clamping plugs. The chuck jaw stopping mechanism is quick and easy to use, accurate, and compact.

Once set up, the chuck jaw stopping mechanism can be removed while the soft jaws maintain position for the jaw forming operation. As such, there is nothing to get in the way of machining the soft jaws. All sides of the soft jaw can be easily accessed during the jaw forming operation, all the way through the inside diameter of the soft jaw, the outside diameter of the soft jaw, and across the entire front face of the soft jaw.

Unlike other devices which require a full counterbore in the face of the soft jaws, the chuck jaw stopping mechanism allows reuse of soft jaws for future jobs, thereby extending the working life of the soft jaws.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

Figure 1:
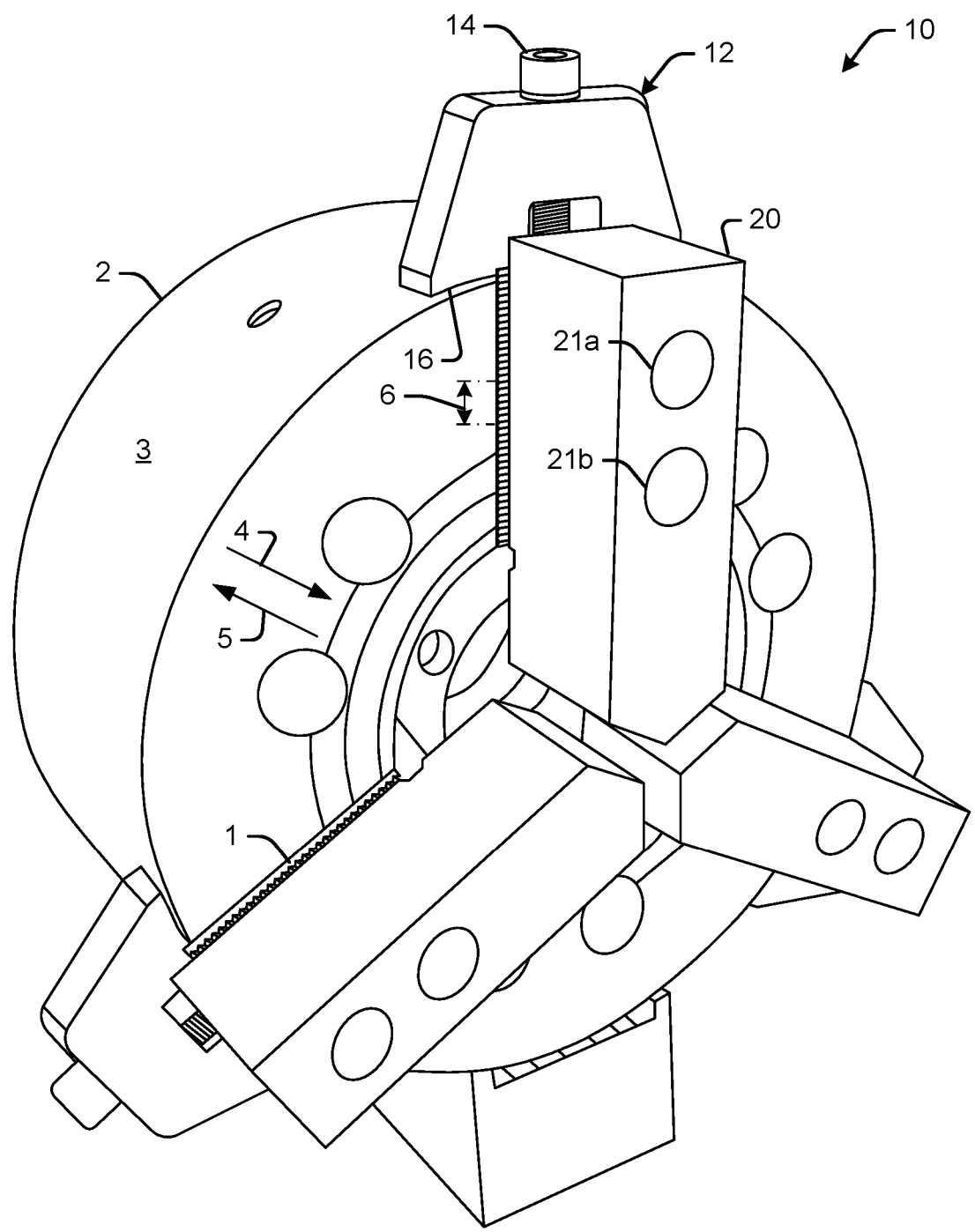
FIG. 1 is a perspective view of an example chuck jaw stopping mechanism as it may be implemented with a lathe.
Figure 2:
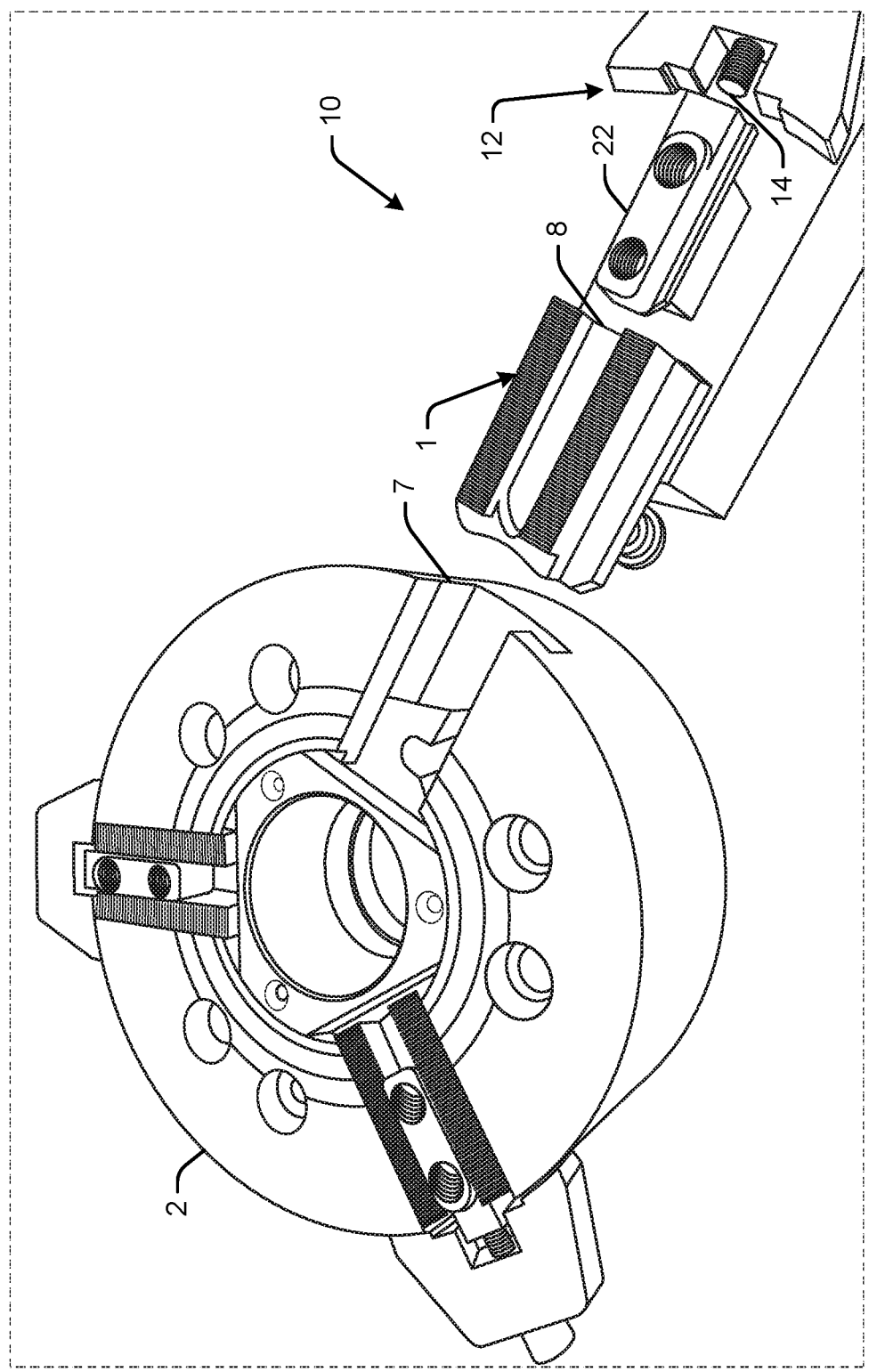
FIG. 2 is a partially exploded view of the example chuck jaw stopping mechanism on a lathe.

FIG. 1 is a perspective view of an example chuck jaw stopping mechanism 10 as it may be implemented with a lathe. FIG. 2 is a partially exploded view of the example chuck jaw stopping mechanism 10 on a lathe.

An example of the chuck jaw stopping mechanism 10 includes a stopping device 12 and a securement device 14 configured to connect the stopping device 12 on a master jaw 1 of a chuck 2 of the lathe. The stopping device 12 has a lower surface 16 that makes contact with an outer circumference 3 of the chuck 2 to stop inward travel at a predetermined position when closing the chuck 2.

In an example, the lower surface 16 moves away (e.g., as illustrated by the direction of arrow 5) from the outer circumference 3 of the chuck 2 to be in an open position. The open position forms a gap between the lower surface 16 of the stopping device 12 and the outside circumference 3 of the chuck 2, e.g., for inserting a machinable part. The lower surface 16 moves against a portion of the outer circumference 3 of the chuck 2 when in a closed position (e.g., moved fully inward as illustrated by the direction of arrow 4). The chuck is moved into the closed position to retain the machinable part during a machining operation.

In an example, the master jaw(s) 1 of the chuck 2 moves in the directions of arrows 4 and 5 within a predetermined range of travel 6. In general, it is desired to mount one or more soft jaw 20 in about the center of the predetermined range of travel 6 for forming the soft jaw 20 during a machining operation. This will allow for the machined soft jaw 20 to move into the open position (e.g., in the direction illustrated by arrow 5) for insertion of the unfinished workpiece. This will also allow for the machined soft jaw 20 to move into the closed position (e.g., in the direction illustrated by arrow 4) to clamp on and apply pressure to the workpiece during a machining operation.

In an example, the stopping device 12 maintains the soft jaw at this predetermined position within a range of travel 6 during machining of the soft jaw 20. That is, the stopping device 12 stops inward movement of the master jaw 1 at the predetermined position for forming the soft jaw 20 during a machining operation.

Figure 4:
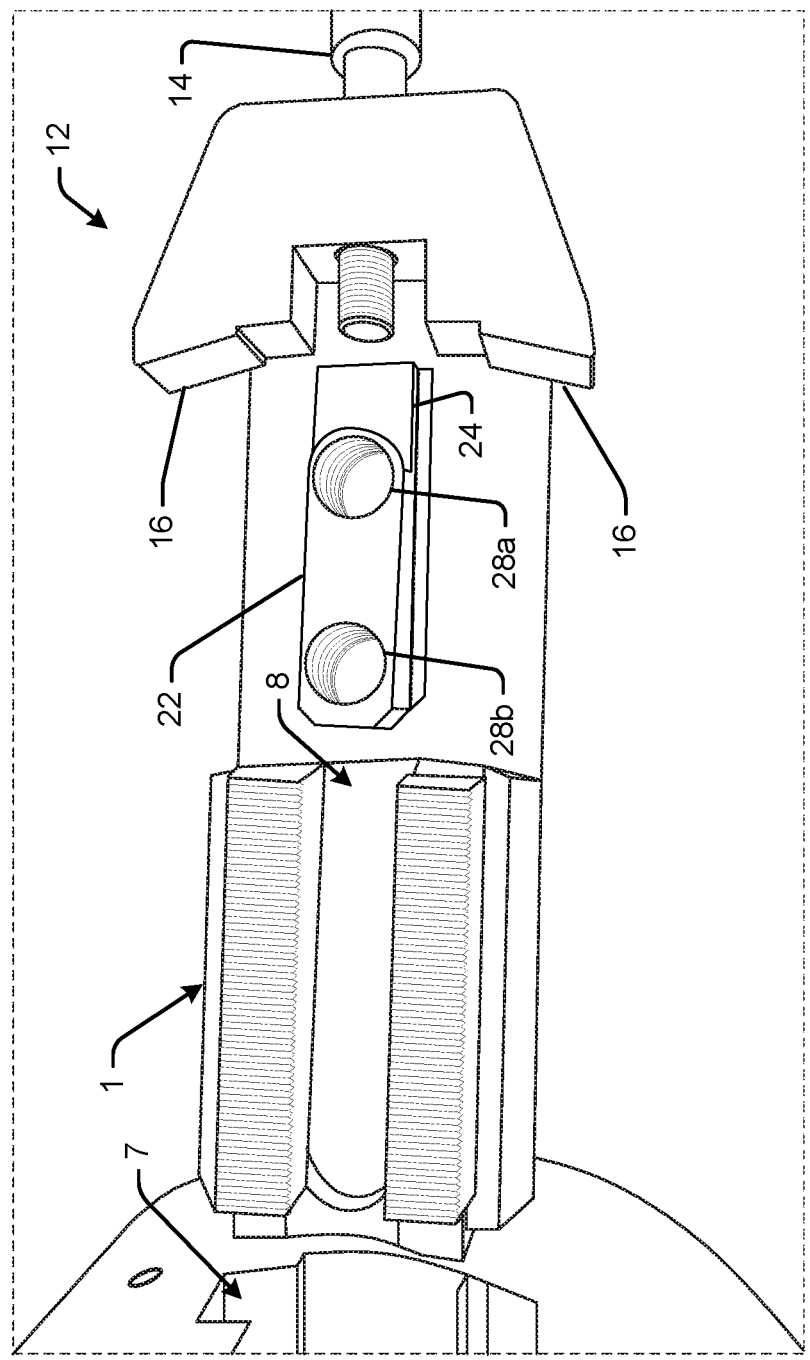
FIGS. 4 and 5 illustrate assembly of the example chuck jaw stopping mechanism on a lathe.
Figure 5:
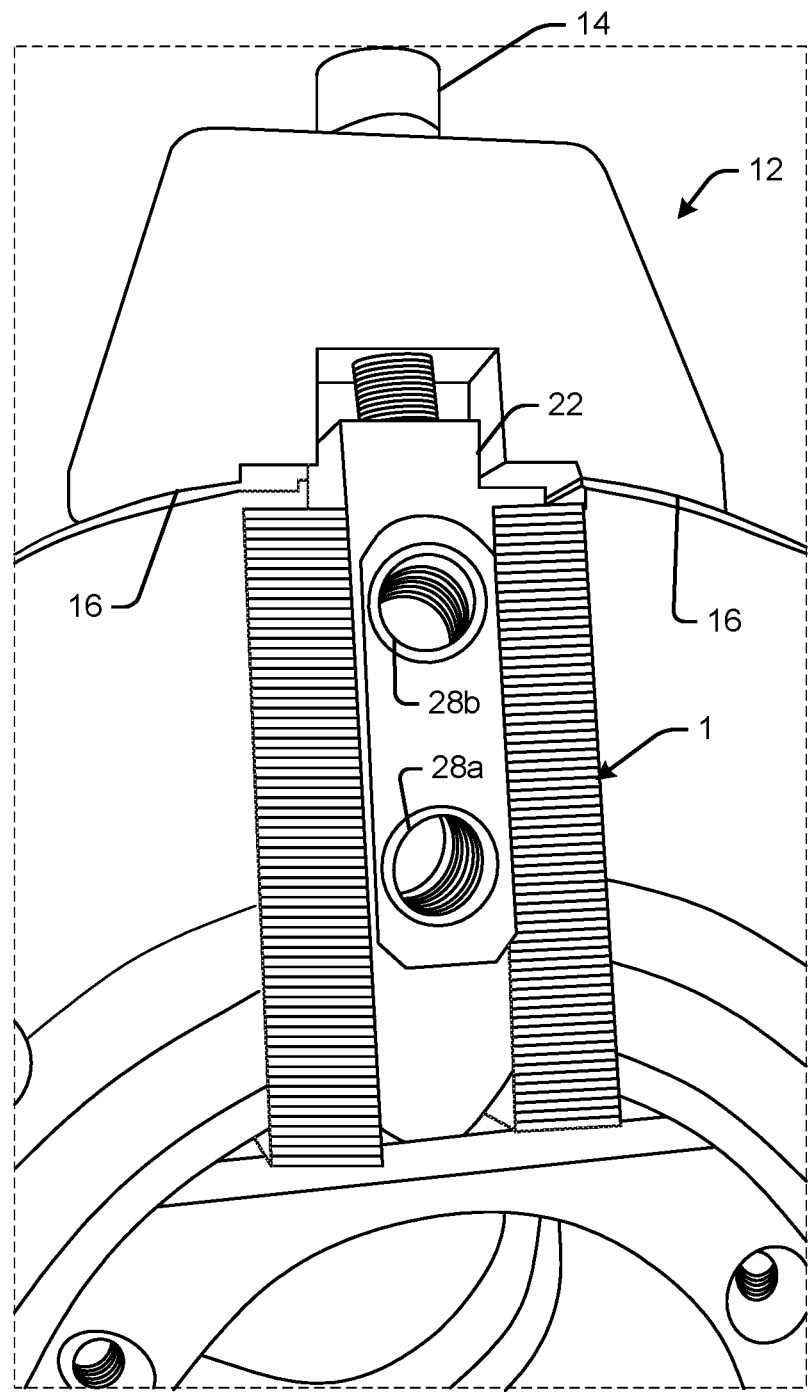

In an example, the stopping device 12 has two arms and the lower surface 16 is formed on each of the two arms. The securement device 14 connects to the master jaw 1 between the two arms of the stopping device 12. In an example, the securement device 14 may be a bolt that threads into a threaded opening in a T-nut 22 of the master jaw 1, e.g., as can be seen in FIGS. 4-5.

Figure 3:
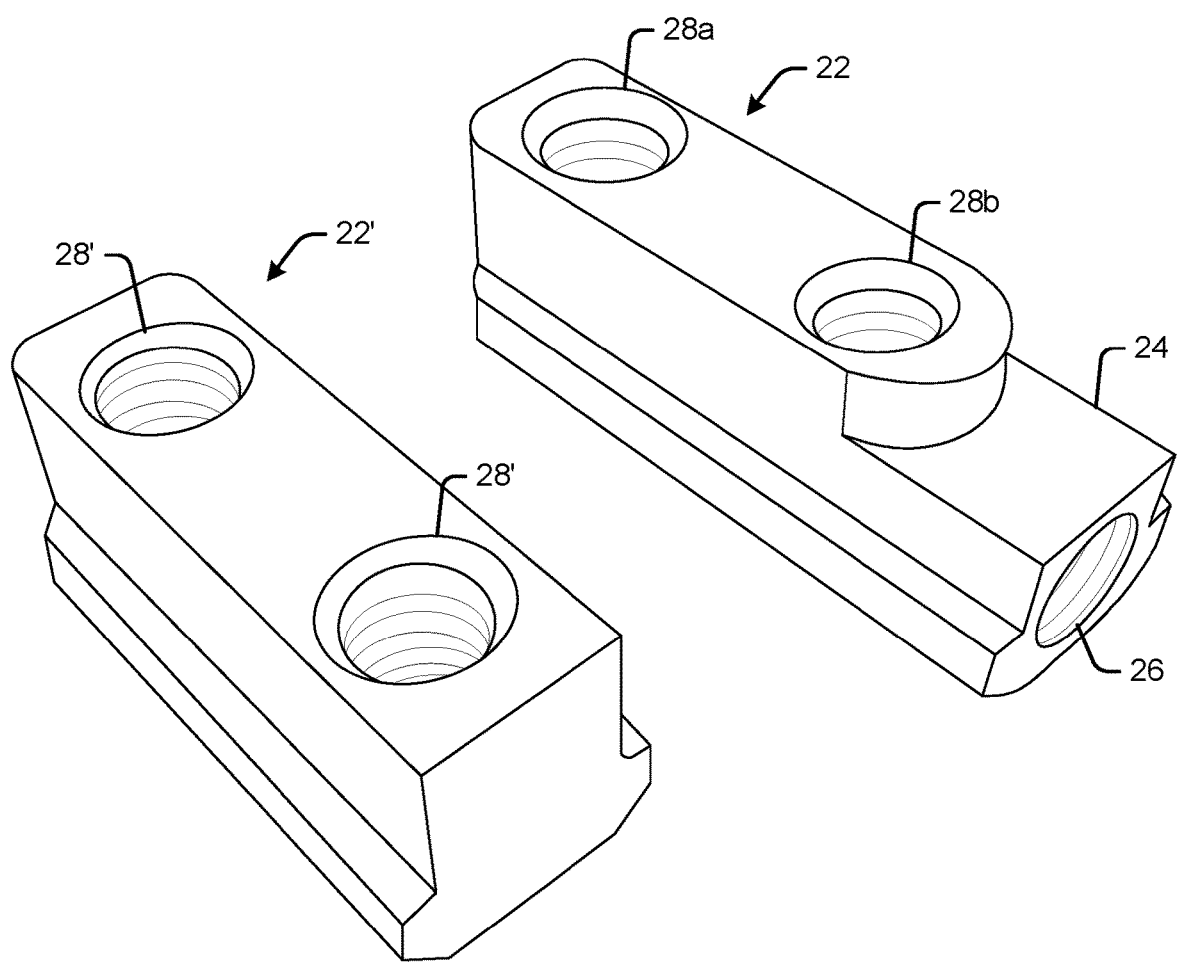
FIG. 3 is a side-by-side view of example T-nuts.

FIG. 3 is a side-by-side view of example T-nuts 22 and 22'. To illustrate, the T-nut 22' is a conventional T-nut that is used to attach a soft jaw to the master jaw 1 of the chuck 1. That is, there is a slot 7 formed in the body or face of the chuck 2 that the master jaw 1 slides into. There is a slot 8 formed in the master jaw 1 that the T-nut 22' slides into. The soft jaw is attached to the T-nut 22' by threaded fasteners through openings 21a, 21b into threaded openings 28'.

The slots 7 and 8 may be referred to as T-slots because of the shape. The slots 7 and 8 are narrow on the top and have a wider portion on the bottom. The wide portion on the bottom works as a clamping surface so when the bolts in the soft jaw are tightened the T-nut 22 clamps onto the master jaw 1 holding the master jaw 1 and the soft jaw 20 securely in place.

The modified T-nut 22 can also be slid into the slot 8 of the master jaw 1 in this same manner. But the modified T-nut 22 has an extended portion 24 with a threaded opening 26 formed therein substantially perpendicular to the openings 28a and 28b of the T-nut 22. The stopping device 12 is attached to the T-nut 22 via fastener 14 into threaded opening 26 in the modified T-nut 22. The soft jaw is attached to the T-nut 22 by threaded fasteners through openings 21a, 21b into threaded openings 28.

FIGS. 4 and 5 illustrate assembly of the example chuck jaw stopping mechanism 12 on a lathe using the T-nut 22. In an example, the T-nut 22 engages with the master jaw 1 and connects the master jaw 1 to the stopping device 12. The T-nut 22 slidably engages and tightens to the master jaw 1. The stopping device 12 connects to the T-nut 22. The soft jaw 20 is attached to the T-nut 22.

In an example, the extended portion 24 of the T-nut 22 pulls toward the stopping device 12 by operation of the fastener 14. The extended portion 24 seats against the stopping device 12 when the soft jaw 20 is located at the desired position on the face of the chuck 2 (e.g., substantially centered within the range of travel 6 of the master jaw 1).

Figure 6:
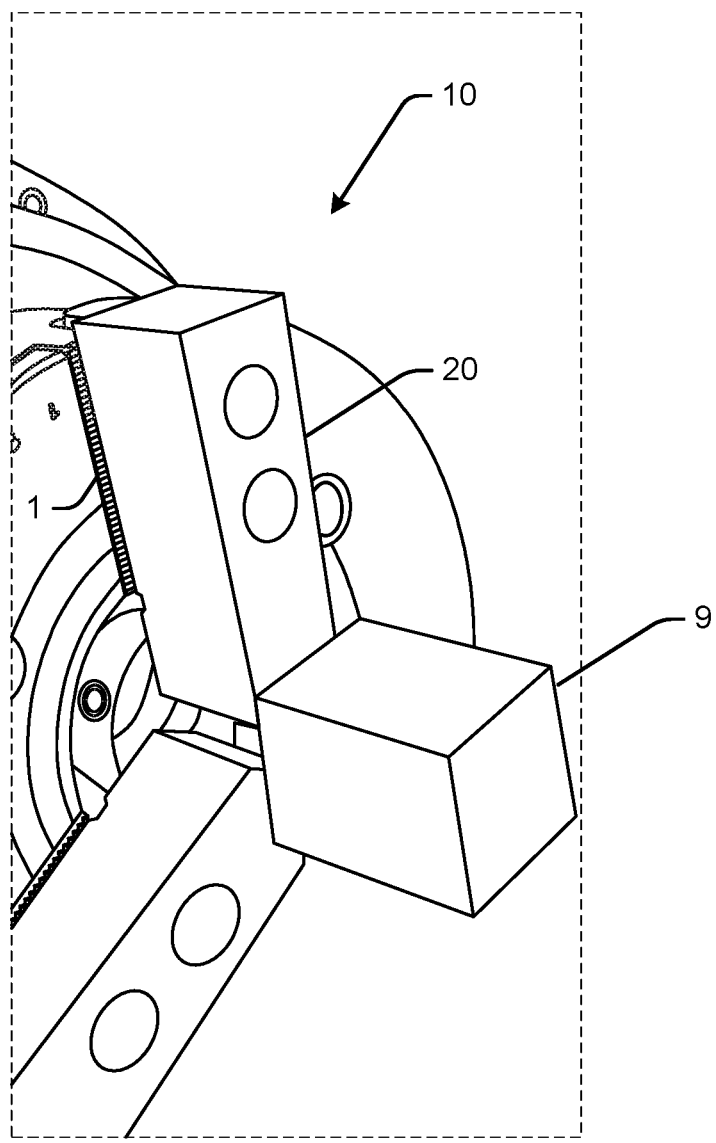
FIGS. 6-8 illustrate an example setup operation with the example chuck jaw stopping mechanism on a lathe.
Figure 7:
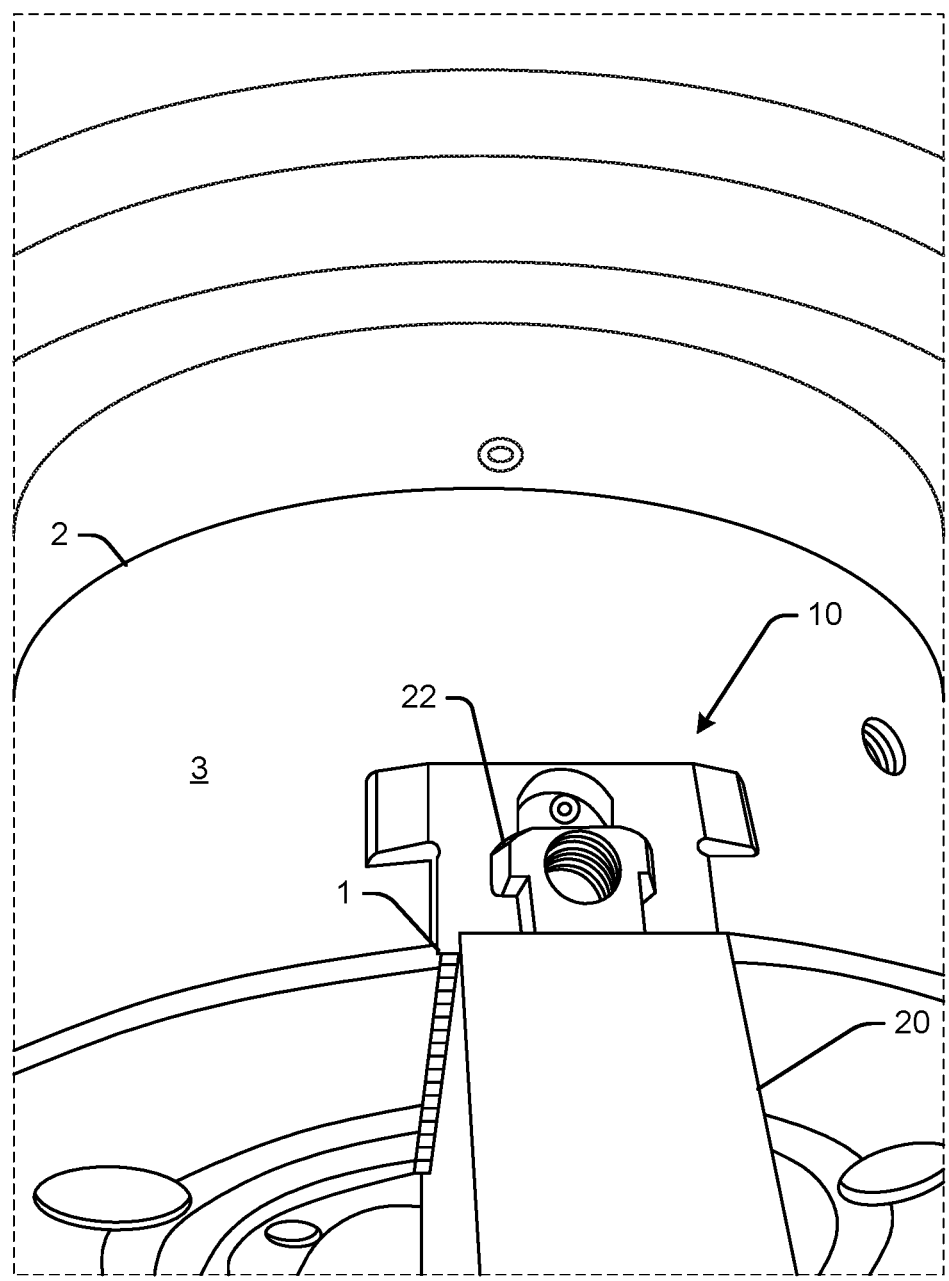
Figure 8:
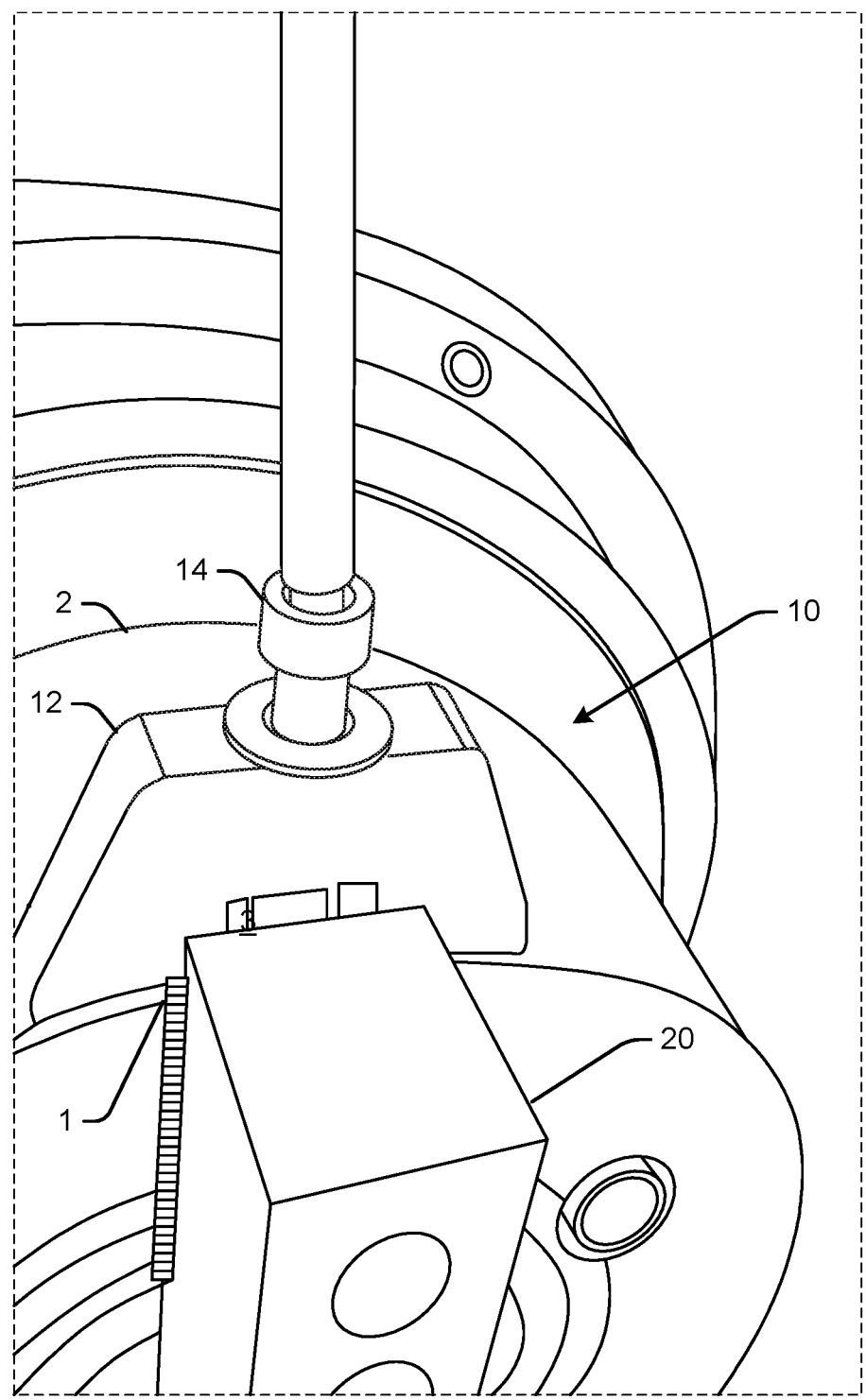

FIGS. 6-8 illustrate an example setup operation with the example chuck jaw stopping mechanism 10 on a lathe. The operations shown and described herein are provided to illustrate example implementations. It is noted that the operations are not limited to the ordering shown. Still other operations may also be implemented.

As described above, the example chuck jaw stopping mechanism 10 includes a stopping device 12 and a T-nut 22 that serves to securely fasten the stopping device 12 to the master jaw(s) 1. The T-nut 22 slides into the master jaw 1. The T-nut 22 can slide in or out so the soft jaw 20 can be moved into the desired position for machining. When the soft jaw 20 is clamped to the master jaw 1, both the soft jaw 20 and the T-nut 22 are held in place using the serrations that are in both the master jaws 1 and the soft jaws 20. After the T-nut 22 is secured in place the stopping device can then be bolted and secured to the master jaw.

A fastener 14 is inserted through the stopping device 12 and into the threaded hole 26 in the T-nut 22 to securely fasten the soft jaw 20 to the master jaw 1 while the lathe chuck 2. While the chuck 2 is in the open position there is a small gap between the stopping mechanism and the outside diameter of the chuck 2. When the master jaw 1 is closed, the stopping device 12 contacts the outside perimeter 3 (or portion thereof) of the lathe chuck 2 and stops movement of the master jaw 1 at the desired point in its travel 6. At this point the soft jaw(s) 20 can be formed to the desired shape for holding a workpiece during a later machining operation.

It is noted that while examples are described herein with reference to implementation on a lathe, that the chuck jaw stopping mechanism 10 may be implemented on other types of machinery where a chuck 2 is used to hold a work piece, such as but not limited to, milling machines and grinders.

In an example, the chuck jaw stopping mechanism 10 is located such that the soft jaw(s) 20 can be formed without interference on all the desired sides of the soft jaw. The soft jaws can be formed on the inside all the way through for outside diameter clamping. The soft jaw(s) 20 can be bored on the face of the soft jaw for any diameter slug, and the outside of the soft jaw can be turned for inside diameter clamping.

When the lathe chuck 2 is in the open position The stopping device 12 is clamped securely to the master jaw 1. There is a gap between the stopping device 12 and the outside diameter 3 of the chuck 2. When the chuck 2 is closed, the stopping device 12 will contact the outside diameter 3 of the chuck 2 and stop so that the soft jaws can be formed. The stopping device 12 is fitted to the outside diameter of the lathe chuck 2 and maintains the soft jaw in place for machining to precise specifications. If there is more than one soft jaw 20 (e.g., mounted on separate master jaws 1), all of the master jaws (and corresponding soft jaws) stop evenly so that all of the soft jaws can be formed.

FIGS. 6-7 show the master jaws mounted in the chuck 2 with the soft jaws 20 bolted on. An example workpiece 9 is shown for which the soft jaws 20 will be formed to hold. The master jaw 1 fits inside the slot in the chuck body, and the T-nut 22 fits in another slot in the master jaw 1, as described above. The stopping device 12 is bolted and secured to the master jaw via the T-nut 22.

The T-nut 22 fits into the master jaw 1 and is how the stopping device 12 is attached to the master jaw 1, e.g., using the threaded portion of the modified T-nut 22. The clamping device 12 is held onto the master jaw 1 using the threads in the T-nut 22.

The chuck 2 is assembled by the master jaw 1 fitting into the slot in the chuck body. The T-nut 22 then slides into the slot in the master jaw 1. Then the stopping device 12 is bolted into the threads in the T-nut 22 to secure the stopping device 12 to the master jaw 1.

In an example, the stopping device 12 is secured to the master jaw 1 while the chuck is in the open position. When the chuck 2 is closed, the stopping device 12 stops on the outside diameter 3 of the body of the chuck 2. When the stopping device 12 contacts the outside of the chuck 2, the master jaw 1 and the soft jaw 20 is held in place so the soft jaw(s) 20 can be formed.

The drawings show a chuck 2 implementing three soft jaws. But any number, size, shape, and configuration of soft jaws 20 may be provided.

Figure 9:
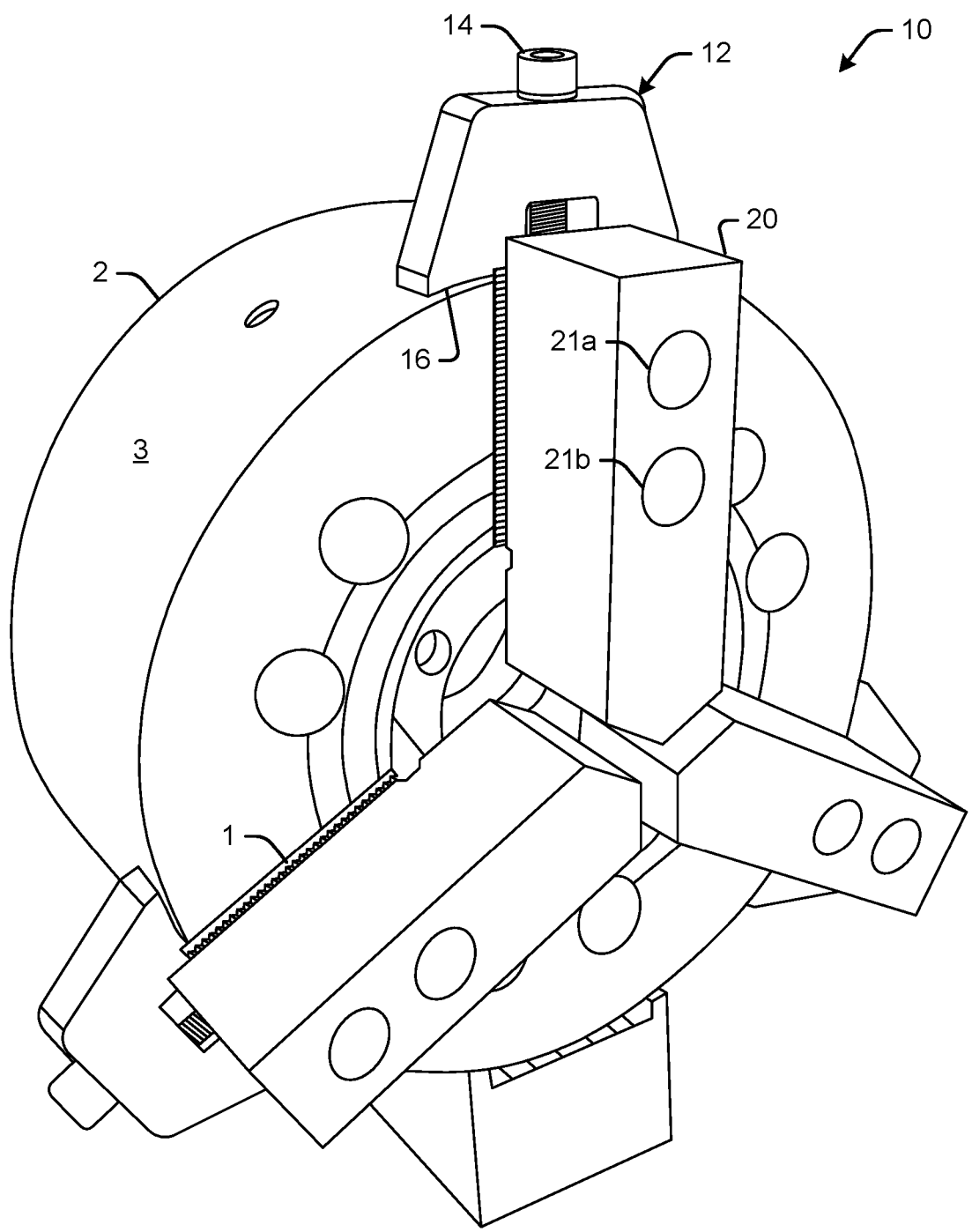
FIG. 9 shows the example chuck jaw stopping mechanism setup on a lathe and ready for a soft jaw machining operation.

FIG. 9 shows the example chuck jaw stopping mechanism 10 setup on a lathe and ready for a soft jaw machining operation. It can be seen that the stopping mechanism 10 is located behind the soft jaw 20 for the machining operation. This enables unfettered access to the soft jaw 20 so that the soft jaw 20 can be formed on the inside diameter, outside diameter, and on the front face. With the stopping mechanism 10 positioned behind the soft jaw 20, short and rigid forming tools can be used for the machining operation.

Figure 10:
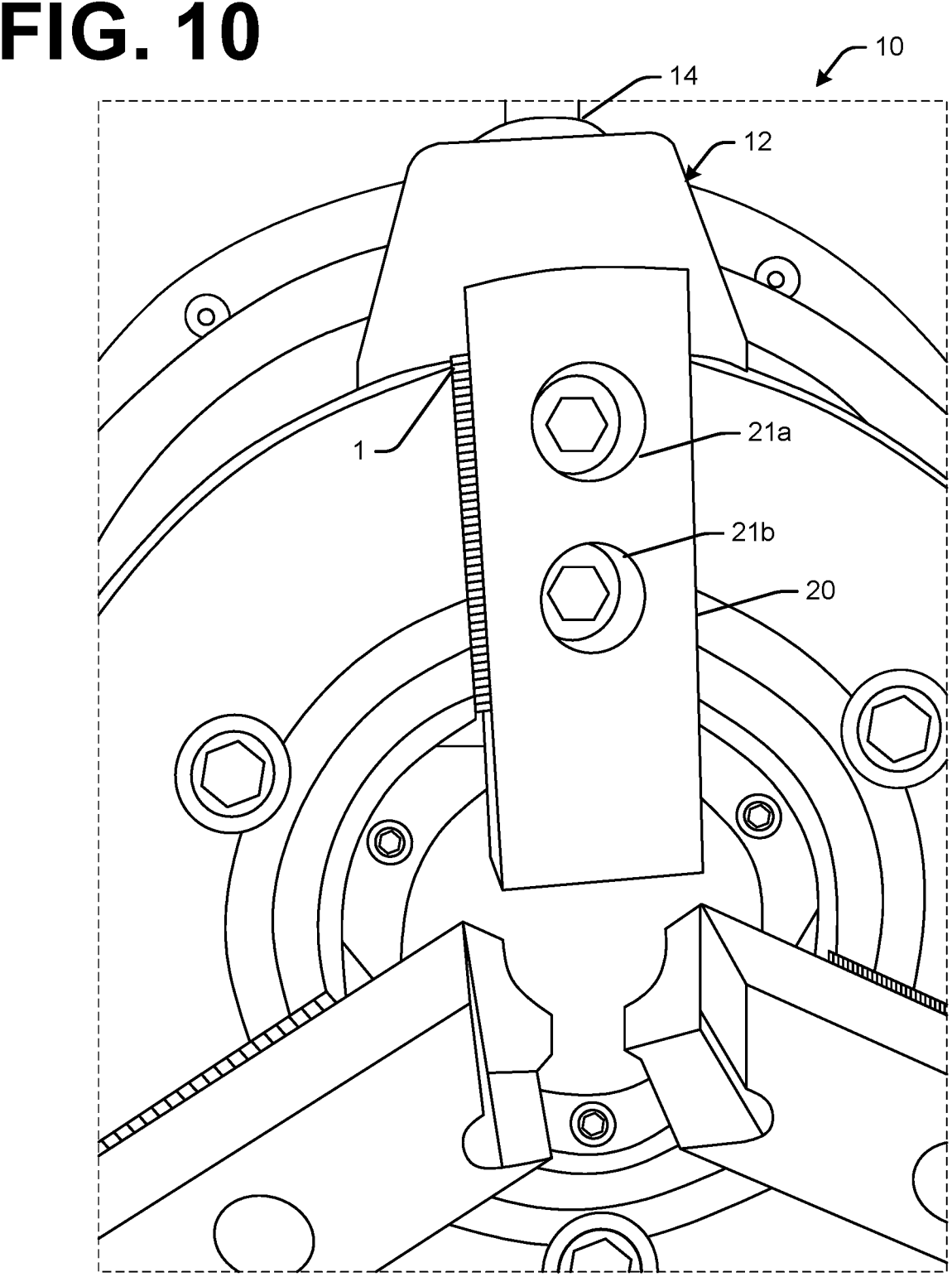
FIG. 10 shows the example chuck jaw stopping mechanism setup on a lathe of FIG. 9 after the soft jaw machining operation.

FIG. 10 shows the example chuck jaw stopping mechanism 10 setup on a lathe of FIG. 9 after the soft jaw machining operation. The workpiece 9 is shown as it may be inserted into the formed soft jaws 20 to be held for a machining operation on the workpiece 9. Any size or shape workpiece 9 may be implemented. The jaw stops travel a small distance between the open position (slightly away from the outside diameter of the chuck) and the closed position (touching the outside diameter of the chuck) of the jaws within the range of travel 6 of the master jaws 1.

Figure 11:
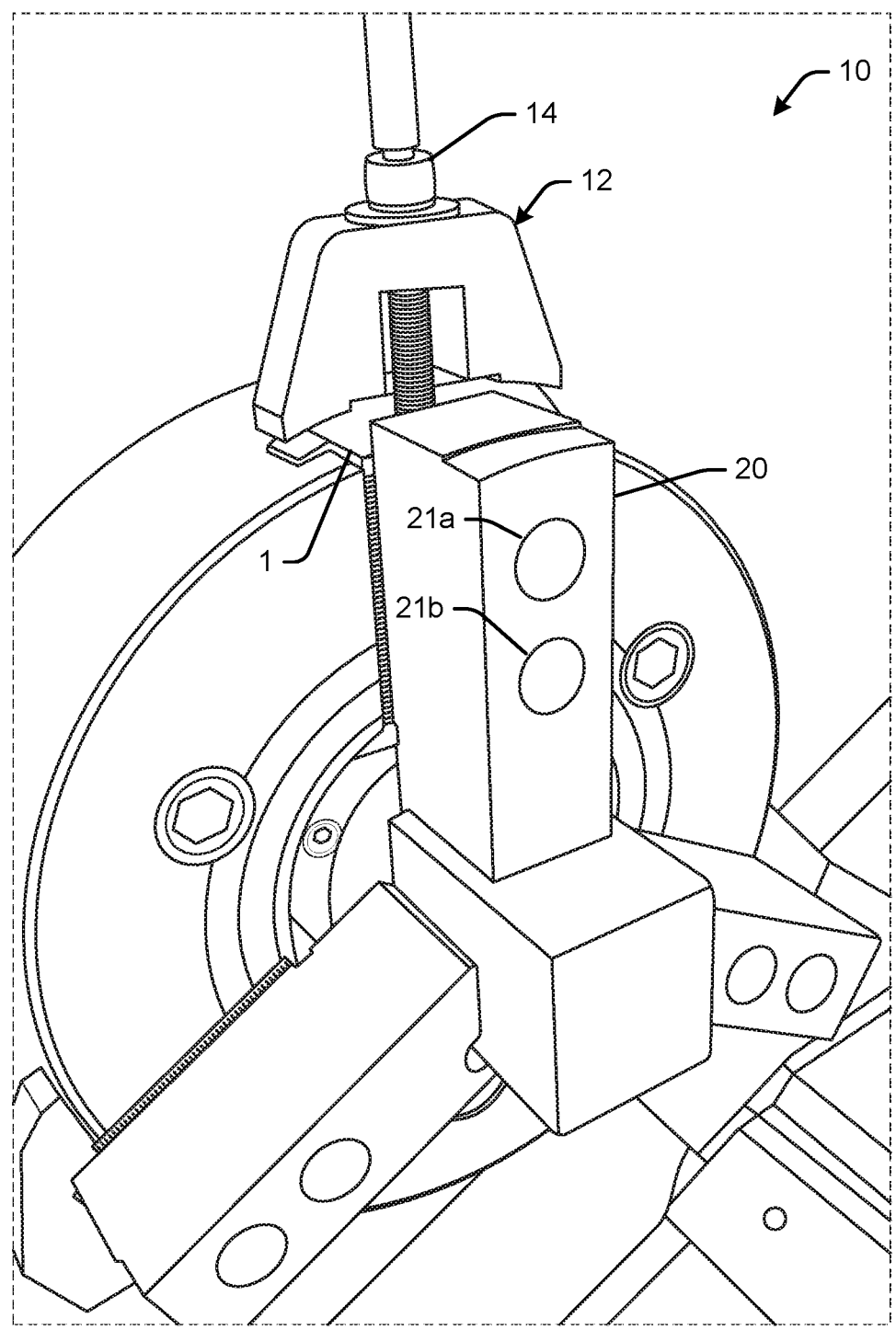
FIG. 11 shows the example chuck jaw stopping mechanism setup on a lathe with the soft jaws ready for a machining operation on a workpiece.

FIG. 11 shows the example chuck jaw stopping mechanism 10 setup on a lathe with the soft jaws 20 ready for a machining operation on a workpiece 9. After forming the soft jaws 20, the jaw stops 12 can be removed from the master jaws 1 and the lathe chuck is ready for production machining operations.

In an example, the chuck jaw stopping mechanism 10 can hold a workpiece 9 with an extremely tight tolerance, maintaining a controlled distance from the face that locates on the master jaw 1 in relation to the face that locates on the outside diameter of the lathe chuck 2.

The example chuck jaw stopping mechanism 10 works very well for this purpose and saves a lot of time as compared to all other available processes and devices. The chuck jaw stopping mechanism 10 may also be used in other work holding capacities, such as machining materials that would be deformed by standard work holding jaws. In addition, the chuck jaw stopping mechanism 10 can be modified to accommodate external clamping in the boring process to allow for internal clamping on the workpiece 9.

It is noted that the examples shown and described are provided for purposes of illustration and are not intended to be limiting. Still other examples are also contemplated.

The invention claimed is:

1. A chuck jaw stopping mechanism for forming a soft jaw for a lathe, comprising:
   a stopping device;
   a securement device configured to connect the stopping device on a master jaw of a chuck of the lathe; and
   a lower surface of the stopping device moving against a portion of an outer circumference of the chuck in a closed position, and the lower surface moving away from the portion of the outer circumference of the chuck in an open position to form a gap between the lower surface of the stopping device and the portion of the outside circumference of the chuck; and
   a T-nut to engage with the master jaw and connect to the stopping device.

2. The chuck jaw stopping mechanism of claim 1, wherein the stopping device maintains the soft jaw at a predetermined position within a range of travel during machining of the soft jaw.

3. The chuck jaw stopping mechanism of claim 1, wherein the stopping device stops inward movement of the master jaw at the predetermined position for forming the soft jaw for holding a workpiece.

4. The chuck jaw stopping mechanism of claim 1, wherein the gap enables a workpiece to be inserted into the soft jaw after forming the soft jaw.

5. The chuck jaw stopping mechanism of claim 1, wherein the securement device is a bolt that threads into a threaded opening of the master jaw.

6. The chuck jaw stopping mechanism of claim 1, wherein the T-nut slidably engages and tightens to the master jaw.

7. The chuck jaw stopping mechanism of claim 1, wherein the stopping device connects to the T-nut.

8. The chuck jaw stopping mechanism of claim 1, wherein the soft jaw is attached to the T-nut.

9. The chuck jaw stopping mechanism of claim 1, wherein the T-nut has an extended portion, the extended portion pulls toward the stopping device by operation of a fastener, the extended portion seating against the stopping device when the soft jaw is located at a predetermined position within a range of travel of the master jaw.

10. The chuck jaw stopping mechanism of claim 1, wherein the stopping device holds the soft jaw without interference during a machining operation to form the soft jaw.

11. The chuck jaw stopping mechanism of claim 1, wherein the stopping device clamps the soft jaw on the outer circumference of the chuck so that the soft jaw can be formed entirely through the soft jaw without clamp interference.

12. The chuck jaw stopping mechanism of claim 1, wherein the soft jaws are machinable to receive any diameter of a slug without clamp interference.

13. The chuck jaw stopping mechanism of claim 1, wherein after forming the soft jaw, the stopping device is removed from the master jaw and the chuck is ready for production.

14. A chuck jaw stopping mechanism for forming a plurality of soft jaws for a lathe, comprising:

a plurality of stopping devices, each of the plurality of stopping devices corresponding to each master jaw of a chuck of the lathe;

a plurality of securement devices each configured to connect the stopping devices on the corresponding master jaws; and a lower surface of the stopping device moving against a portion of an outer circumference of the chuck in a closed position, and the lower surface moving away from the portion of the outer circumference of the chuck in an open position to form a gap between the lower surface of the stopping device and the portion of the outside circumference of the chuck; and a T-nut to engage with the master jaw and connect to at least one of the stopping devices, the T-nut slidably engages and tightens to the master jaw, wherein the at least one of the stopping devices connects to the T-nut and the soft jaw is attached to the T-nut;

wherein each of the stopping devices uniformly stops the corresponding master jaw for forming the soft jaws with the lathe.

15. The chuck jaw stopping mechanism of claim 14, wherein each of the stopping devices stop inward movement of the master jaw at a predetermined position for forming the soft jaw for holding a workpiece.

16. The chuck jaw stopping mechanism of claim 14, wherein the T-nut has an extended portion, the extended portion pulls toward the at least one of the stopping devices by operation of a fastener, the extended portion mating with the at least one of the stopping devices to maintain the soft jaw at a predetermined position within a range of travel during machining of the soft jaw.

17. A chuck jaw stopping mechanism for forming a soft jaw for a lathe, comprising:

a stopping device;

a securement device configured to connect the stopping device on a master jaw of a chuck of the lathe; and a lower surface of the stopping device moving against a portion of an outer circumference of the chuck in a closed position, and the lower surface moving away from the portion of the outer circumference of the chuck in an open position to form a gap between the lower surface of the stopping device and the portion of the outside circumference of the chuck;

wherein the stopping device has two arms and the lower surface is formed on each of the two arms.

18. The chuck jaw stopping mechanism of claim 17, wherein the securement device connects to the master jaw between the two arms of the stopping device.

\* \* \* \* \*